Nov. 1, 1949   S. R. McCLURE   2,487,026
ONE-WAY WEDGING CLUTCH
Filed Nov. 24, 1944
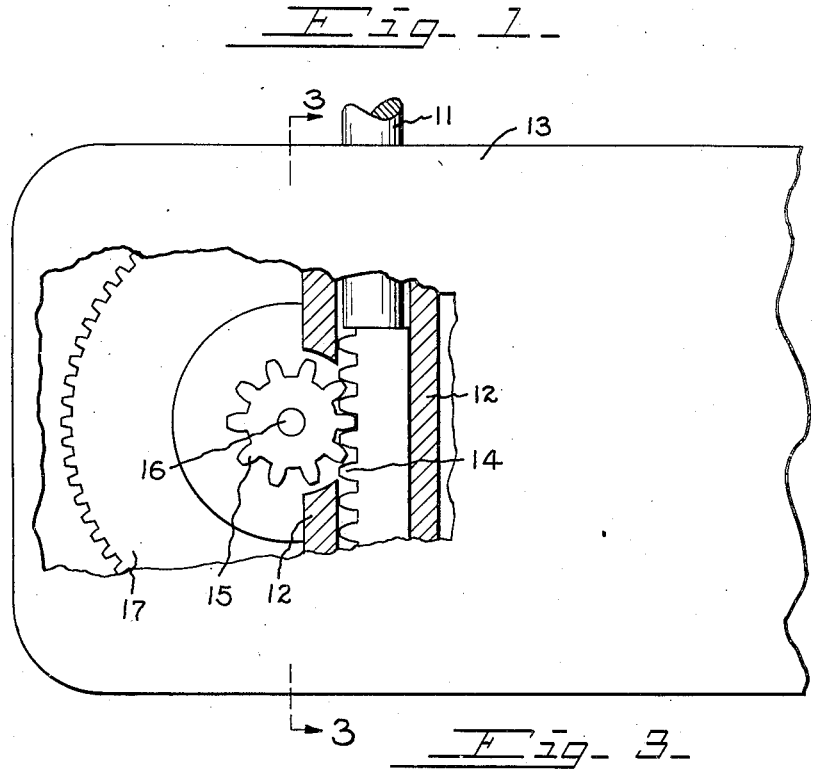
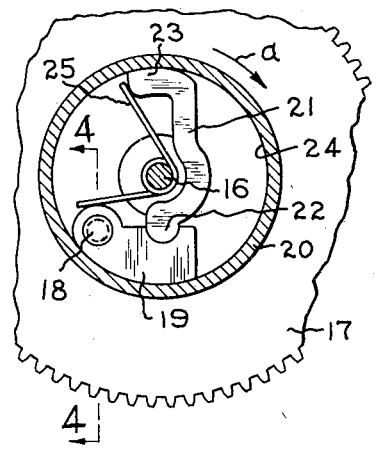
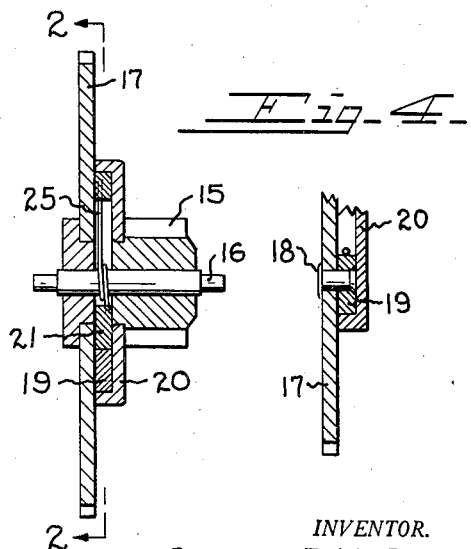
INVENTOR.
STANLEY R. McCLURE.
BY
*H. C. Karel*
ATTORNEY.

Patented Nov. 1, 1949

2,487,026

UNITED STATES PATENT OFFICE 2,487,026

ONE-WAY WEDGING CLUTCH

Stanley R. McClure, Cincinnati, Ohio, assignor to Dayton Acme Co., Cincinnati, Ohio, a corporation of Ohio Application November 24, 1944, Serial No. 564,933

1 Claim. (Cl. 192—45.1)

This invention relates to an improved driving mechanism wherein reciprocating motion is changed to continuous rotary motion and wherein one member of the driving couple forms its driving connection in one direction of rotation and slips in the other direction.

The object of my invention is to provide a friction driving couple functioning as a friction clutch for propelling one of the members in one direction.

A further object is to provide a pair of cooperating arms forming the friction driving members.

My invention will be further readily understood from the following description and claim, and from the drawings, in which latter:

Fig. 1 is a side view of a portion of a generator flashlight, partly broken away.

Fig. 2 is a detail section, taken in the plane of the line 2—2 of Fig. 3.

Fig. 3 is a section view, taken in the plane of the line 3—3 of Fig. 1, and;

Fig. 4 is a detail section, taken in the plane of the line 4—4 of Fig. 2.

My improved driving mechanism is shown in connection with a hand generator flashlight, wherein reciprocation of the rod 11 imparts rotary motion to a train of gears for rotating a permanent magnet to charge a coil for illuminating a light. In this connection it is desirable to reduce the noise of the working parts to a minimum and therefore I have devised a friction clutch which is simple in construction and will form a positive drive in one direction and slip in the other direction.

The rod 11 is reciprocated in guides 12 in the case 13 and is provided with rack teeth 14 for rotating a pinion gear 15 rotating freely on a shaft 16 suitably journalled in the case 13. A gear 17 is fixed to the shaft 16 and has a stud rivet 18 extending therefrom having an arcuate member 19 pivoted thereon and riding within a casing 20 fixed to the pinion gear 15. A clutch arm 21 has one end 22 pivoted in the arcuate member 19 and the other end forming an arcuate face 23 contacting the rim 24 of the casing 20. A spring 25 is coiled on the shaft 16 and has its free ends bearing against the end of the arm 21 and the member 19 to maintain the arm 21 in driving relation to the casing 20. Upon stoppage of the pinion gear 15 or reverse rotation of the pinion gear with the gear 17 continuing to rotate in the direction of the arrow a, causes the arm 21 to react against the spring 25 to relieve the tension of the clutch and permit the gear to freely slip.

From the foregoing, it will be apparent that I have devised a simple inexpensive driving mechanism which will be quiet in operation and drive or lock the respective parts while rotating in the direction of the arrow a and slip in the opposite direction.

Having thus fully described my invention, what I claim as new and desire to secure by Letters Patent, is:

A clutch comprising a casing, a driven member, an arcuate member pivoted to said driven member and riding within said casing, a clutch arm pivoted to said arcuate member and provided with an arcuate face, a shaft extending through said casing and said driven member, a spring coiled on said shaft and having its free ends urging said arm and arcuate member into contact with said casing whereby movement of said casing in one direction will cause movement of said driven member and cause slippage of said driven member when said casing is rotated in the reverse direction.

STANLEY R. McCLURE.

REFERENCES CITED

The following references are of record in the file of this patent:

UNITED STATES PATENTS

| Number | Name | Date |
|---|---|---|
| 298,930 | Wright | May 20, 1884 |
| 674,213 | Oldfield | May 14, 1901 |
| 999,037 | Kleinman | July 25, 1911 |
| 1,080,486 | Sheagren | Dec. 2, 1913 |
| 1,349,470 | Muller | Aug. 10, 1920 |
| 1,600,088 | Burstyn | Sept. 14, 1926 |
| 2,084,226 | Strahm | June 15, 1937 |

FOREIGN PATENTS

| Number | Country | Date |
|---|---|---|
| 10 | Great Britain | 1870 |
| 362,696 | Italy | Sept. 1, 1938 |